April 7, 1964            A. CAUNT            3,127,673
METHOD OF ASSEMBLING RUBBER BUSH UNITS
Filed Dec. 3, 1959
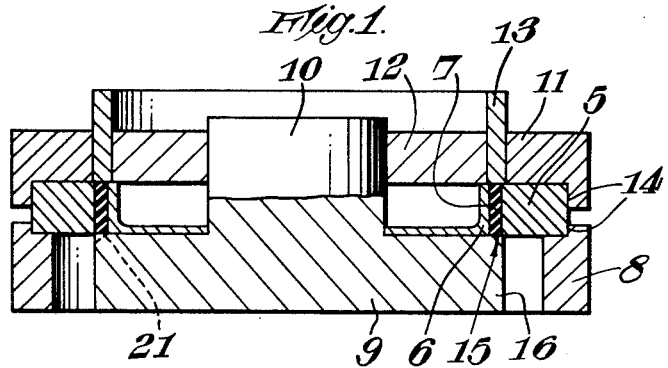
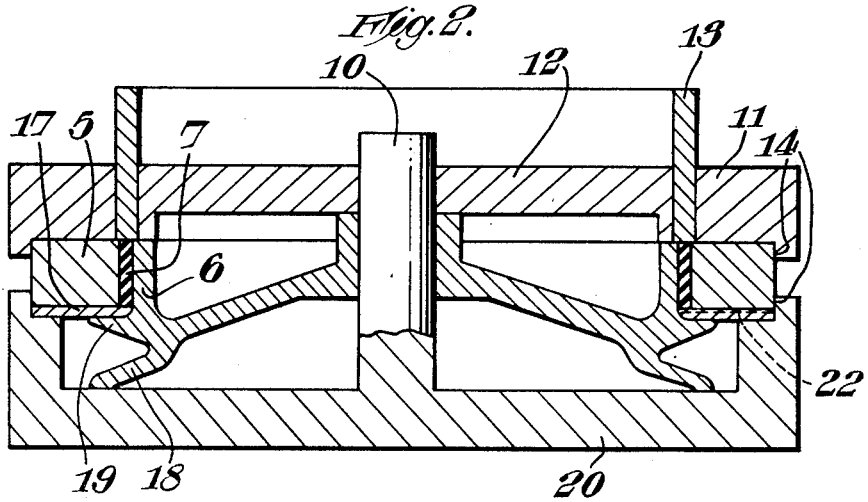
Inventor
Alan Caunt
By Ralph B. Stewart
Attorney United States Patent Office 3,127,673
Patented Apr. 7, 1964

3,127,673
METHOD OF ASSEMBLING RUBBER BUSH UNITS
Alan Caunt, Oadby, England, assignor to Metalastik Limited, Leicester, England, a British company
Filed Dec. 3, 1959, Ser. No. 857,211
Claims priority, application Great Britain Jan. 13, 1959
2 Claims. (Cl. 29—450)

This invention concerns a method of assembling rubber bush units comprising inner and outer concentric, nested, rigid members (e.g. metal sleeves) and a resilient bush of rubber or like material held pre-compressed radially in an annular space therebetween.

The present invention particularly relates to torsional vibration dampers wherein the inner member is carried by, or secured to, a shaft (said member being called the hub member) and the outer member is an inertia ring.

It is known to assemble a torsional vibration damper by a method which comprises locating a rubber bush in spaced axial alignment with the hub member and inertia ring (while these parts are held concentric) and applying axial pressure to the rubber bush to force the latter to between the hub member and the inertia ring. The bush, prior to assembly, has a wall thickness greater than the radial distance between the hub member and inertia ring so that after assembly the rubber bush is held pre-compressed radially in the annular space between the hub member and the inertia ring.

Difficulty has been experienced in ensuring that the rubber bush is uniformly set in correct axial relationship between the hub member and inertia ring particularly on that face which is remote from the application of axial pressure to the rubber ring, and an object of the present invention is the provision of a method of assembly whereby this difficulty may be overcome.

It is desirable that the rubber bush be in correct and uniform axial relationship between the hub and the inertia ring in order that the shear stress in the rubber be uniform during torsional movement of the inertia member, such as occurs during the working life of the unit, and in consequence the fatigue life of the unit is not impaired, and more accurate control of the unit's stiffness ensured.

According to the invention there is provided a method of assembling a unit comprising inner and outer concentric nested rigid members and a resilient bush of rubber or the like material held pre-compressed radially in an annular space therebetween, the method comprising supporting said rigid members in concentric nested relation one within the other so as to define between them the radial dimension of said annular space, confining said gush between radially inner and outer support members with said bush in spaced axial alignment with said annular space, engaging a rigid plunger directly over the whole of one end surface of said bush, forcing said bush by movement of said plunger axially into said annular space with radial compression of said bush and into abutting relation with a further rigid member substantially completely closing the other end of said annular space, and continuing said movement of said plunger until said annular space is confined in axial dimension between said plunger and said further rigid member and said bush occupying said annular space is compressed to completely fill the volume of said annular space and relieve the undesirable frictional forces produced between said bush and said inner and outer nested members during the forcing of said bush into said annular space.

This annular space is thus completely filled with the rubber element, to the exclusion of air, surplus lubricant used during assembly, etc., and the rubber element is thus uniformly set between the hub and outer ring.

A method in accordance with the invention will now be described, by way of example only, with reference to the accompanying drawings which show alternative forms of apparatus according to the invention for performing the method.

In the drawings:

FIG. 1 is a sectional elevation of one apparatus and
FIG. 2 is a view corresponding to FIG. 1 showing the alternative apparatus.

The apparatus of FIGS. 1 and 2 is provided for the assembly of a torsional vibration damper which comprises an inertia ring 5, a hub member 6, and a resilient ring or bush of rubber or the like material 7 held pre-compressed radially in an annular space therebetween. The apparatus comprises a support structure comprising a base ring 8, a bed 9, and inner and outer ring members 11 and 12. The inertia ring 5 rests upon the base ring 8 and the hub member 6 rests upon the bed 9. The bed 9 has a boss 10 which locates the hub member 6 concentrically therewith. The ring 5 is located concentrically with the boss 10 by the members 11, 12 and the plunger 13 which passes between the members, it being noted that the parts 8 and 11 are stepped, as at 14, for engagement with the ring 5.

The ring members 11 and 12 define an annular space between them wholly to contain the bush 7 in spaced axial alignment with the ring 5 and the hub member 6. In the drawing this space is shown wholly occupied by the plunger 13, the plunger being in its lowermost position. The annular space just referred to is open at its upper side in the drawings for the entry of the plunger and at its lower side in the drawing it opens directly to one side of the annular space between the hub member 6 and the ring 5, the latter space in the drawing being shown wholly occupied by the bush 7.

The bush 7 is initially introduced into the space between the ring members 11 and 12 which is larger than that between the hub member 6 and the ring 5 by an amount affording no difficulty in the initial positioning of the uncompressed bush.

The plunger 13 is then moved down so as to enter the space between the members 11 and 12 and to engage the upper surface of the bush. Pressure is then applied to the plunger to force the bush 7 from between the ring members 11 and 12 into the annular space between the ring 5 and the hub member 6. The thickness of the bush 7 is greater than the radial distance between the ring 5 and the hub member 6 so that when the bush is forced into the annular space between them it becomes radially compressed.

Hitherto, by assembling in the manner generally described so far the face 15 of the ring 7 has been uneven e.g. it is wavy around its circumference or is formed with local pockets where the ring has not passed completely to the lower sides of the ring 5 and the hub member 6.

In the apparatus now being described the support structure comprises a rigid member which closes the side of the annular space between the ring 5 and the hub member 6 which is remote from the plunger 13, this member in the present instance being formed by the peripheral edge portion of the bed 9, this being generally indicated at 16.

When the bush 7 is forced to between the ring 5 and the hub member 6 by the plunger 13 axial pressure is maintained so that the bush 7 is volumetrically compressed within the closed space defined by the ring 5 and the hub member 6, the portion 16 of the bed 9 and the lower face of the plunger 13. In this way it is ensured that the space referred to is completely filled with the rubber of the bush, that the undesirable frictional forces produced between the bush and the nested unit members 5, 6 during the forcing of the bush into such space are relieved, and that a good flush surface is provided at 15 on the bush as well as at the side next to the plunger 13.

In FIG. 2 like parts to those of FIG. 1 are indicated by like numerals. The construction and operation of the apparatus is generally as already described. However, the annular space between the ring 5 and the hub member 6 is closed by a rigid member in the form of a plate 17. The plate 17 is split into at least two part-circular parts so that after assembly the plate 17 may be removed, the assembly of torsional vibration damper comprising the ring 5 the hub member 6, the rubber bush 7 and a driving pulley 18 formed integrally with the hub member. The flange 19 of the pulley 18 provides adequate support for the plate 17 during assembly.

It may be arranged that the upper surface of the peripheral edge portion 15 of the bed 9 or the upper surface of the plate 17 is formed with radial or circumferential grooves or is knurled or otherwise provided with small channels for the escape of air and possibly surplus lubricant used during the assembly from in front of the advancing bush 7. Radial grooves or channels are indicated at 21 in FIG. 1. In FIG. 2, the parts of plate 17 may be constructed to leave radial channels 22.

In the construction of FIG. 2 the parts 8 and 9 of FIG. 1 are dispensed with and replaced by a bed 20 which carries the boss 10.

In yet another alternative arrangement the flange 19 of the pulley 18 may be utilized as the rigid member which closes the annular space between the ring 5 and the hub member 6.

During or after the operation of forcing the bush 7 axially into the annular space between the ring 5 and the hub member 6, either the ring 5 or the member 6, or both the ring 5 and the member 6 may in known manner be oscillated to and fro whilst maintaining the ring and the hub member concentric with one another thereby to cause relative oscillatory movement between the ring and the hub member. The relative oscillatory movement which is imparted to the ring and the hub member may be about the concentric axis of the ring and the hub member or it may be in a direction along the concentric axis.

The relative oscillatory movement may be imparted to the ring and the hub member at the same time as the bush 7 is being forced between them by the plunger 13, that is to say while the plunger 13 is moving downwardly, or the bush may be forced between the ring and the hub member in stages the relative oscillatory movement being imparted to the ring and the hub member between each stage, that is to say with the plunger 13 stationary but nevertheless holding the bush under axial load or with the plunger withdrawn out of contact with the bush.

Instead of imparting the relative oscillatory movement to the ring and the hub member during the operation of forcing the bush into the annular space between them this may be done after that operation has been completed.

Instead of relatively oscillating the ring and the hub member, either the ring or the hub member or both the ring and the hub member may be rotated about the concentric axis during or atfer the operation of forcing the bush 7 axially between them so as to impart a relative rotation between the ring and the hub member.

The relative rotation imparted may be part of a single turn or one, two or three turns.

The purpose of moving the ring 5 and the hub member 6 relatively to one another during or after the assembling operation is to ensure as far as possible a uniformity of stress distribution in the rubber bush. In this connection it is important that in the assembled damper, when released from the support structure and in use, the inertia ring remains properly balanced, i.e. concentric with the hub member. By moving the ring 5 and the hub member 6 relatively to one another the bush 7 is caused to take on a more uniform and even disposition in the annular space between them. The relative movement, when performed while the bush is being forced axially between the ring and the hub member also assists the entry of the bush between the ring and the hub member.

The bush may be a complete unsplit ring, or a strip of rubber formed into a ring with the ends abutting or spaced by a small amount.

I claim:

1. A method of assembling a unit comprising inner and outer concentric nested rigid members and a resilient bush of rubber or the like material held pre-compressed radially in an annular space therebetween, the method comprising supporting said rigid members in concentric nested relation one within the other so as to define between them the radial dimension of said annular space, confining said bush between radially inner and outer support members with said bush in spaced axial alignment with said annular space, engaging a rigid plunger directly over the whole of one end surface of said bush, forcing said bush by movement of said plunger axially into said annular space with radial compression of said bush and into abutting relation with a further rigid member substantially completely closing the other end of said annular space, and continuing said movement of said plunger until said annular space is confined in axial dimension between said plunger and said further rigid member and said bush occupying said annular space is compressed to completely fill the volume of said annular space and relieve the undesirable frictional forces produced between said bush and said inner and outer nested members during the forcing of said bush into said annular space.

2. A method according to claim 1 wherein air is allowed to escape from in front of the bush as said bush is forced into the annular space.

References Cited in the file of this patent

UNITED STATES PATENTS

| 2,639,496 | Hartzell | May 26, 1953 |
| 2,763,055 | Hardy | Sept. 18, 1956 |
| 2,795,037 | Haushalter | June 11, 1957 |
| 2,914,844 | Marshall et al. | Dec. 1, 1959 |
| 2,924,008 | Haushalter | Feb. 9, 1960 |
| 2,930,640 | Davis et al. | Mar. 29, 1960 |
| 2,958,124 | Hardy | Nov. 1, 1960 |

FOREIGN PATENTS

| 785,106 | Great Britain | Oct. 23, 1957 |